ced on each side of the head. The head is provided
UNITED STATES PATENT OFFICE.

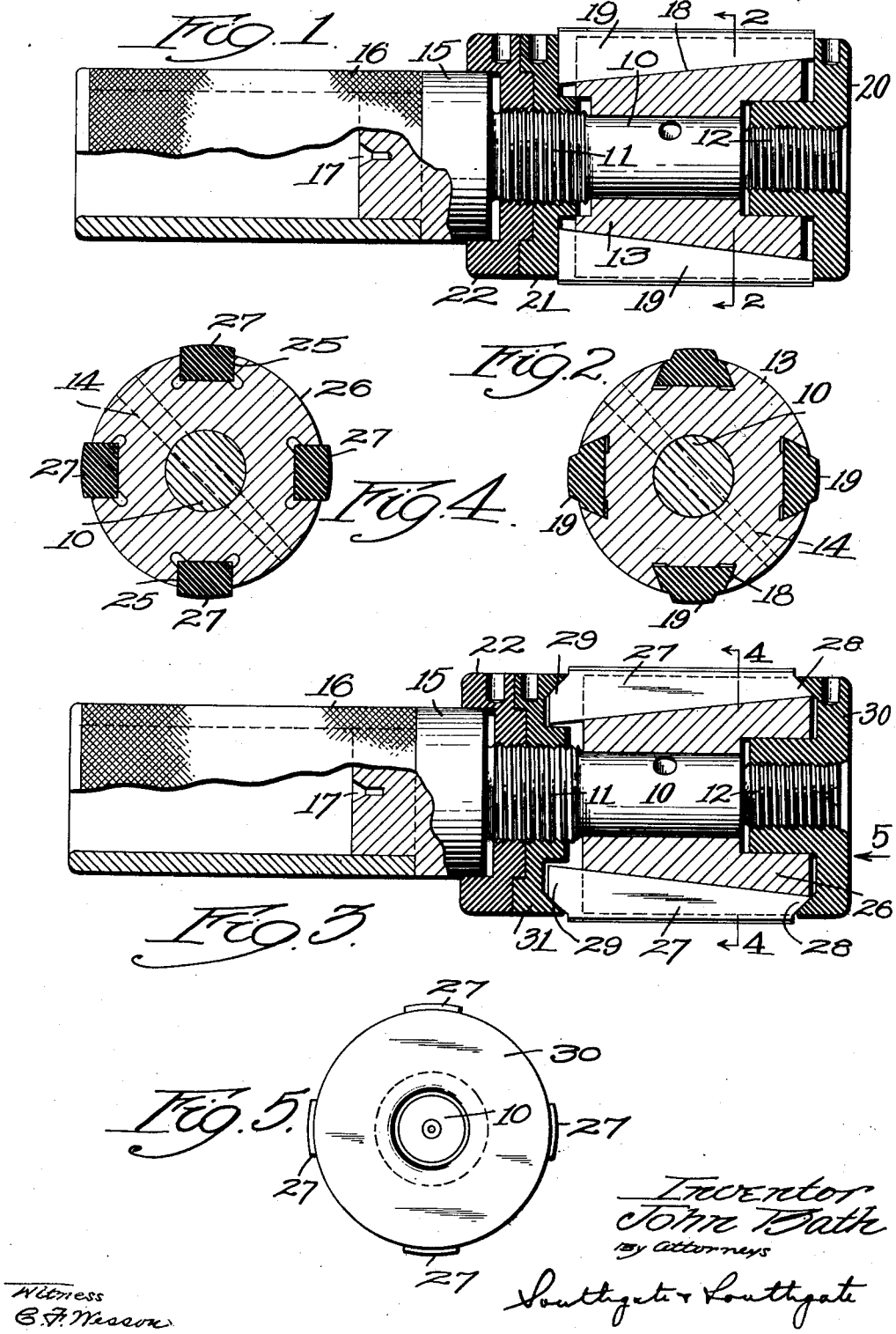

JOHN BATH, OF WORCESTER, MASSACHUSETTS, ASSIGNOR TO JOHN BATH & CO., INC., A CORPORATION OF MASSACHUSETTS.

REFERENCE-GAGE.

1,369,317.　　　　Specification of Letters Patent.　　Patented Feb. 22, 1921.

Application filed October 27, 1919. Serial No. 333,650.

*To all whom it may concern:*

Be it known that I, JOHN BATH, a citizen of the United States, residing at Worcester, in the county of Worcester and State of Massachusetts, have invented a new and useful Reference-Gage, of which the following is a specification.

This invention relates to an adjustable gage, particularly designed for a reference gage to be set to a selected size and to preserve such setting for a considerable period. In such a gage accuracy and reliability are of greater importance than extremely rapid adjustment.

It is the general object of my invention to provide a reference gage which may be easily and accurately adjusted to a desired size, and in which the setting of the gage cannot be accidentally disturbed.

In the preferred form, the invention comprises a body portion or head mounted upon or formed integral with a rod threaded on each side of the head. The head is provided with inclined guideways within which tapered gage bars are slidably mounted, said bars being adjustable in said guideways by collars threaded on said rod at each side of the head.

My invention further relates to arrangements and combinations of parts hereinafter described and more particularly pointed out in the appended claims.

Two forms of my invention are shown in the drawings, in which—

Figure 1 is a longitudinal sectional elevation of a gage embodying my invention;

Fig. 2 is a transverse sectional view taken along the line 2—2 in Fig. 1;

Fig. 3 is a longitudinal sectional elevation of a second form of my invention;

Fig. 4 is a transverse sectional elevation taken along the line 4—4 in Fig. 3; and Fig. 5 is an end elevation of the gage shown in Figs. 3 and 4.

Referring first to Figs. 1 and 2, this form of my improved gage comprises a rod 10 having threaded portions 11 and 12 and having a body portion or head 13 positioned between the threaded portions 11 and 12. The head 13 may be formed integral with the rod or may be fixed thereto in any convenient manner as by a cross-pin 14, as shown in dotted lines in Fig. 2.

The left-hand end of the rod 10, as viewed in Fig. 1, is preferably enlarged at 15 and supports a knurled sleeve 16 forming a handle for the gage. The sleeve 16 also serves to protect the center 17 from possible injury.

The head 13 is provided with a plurality of inclined dove-tailed guideways 18 within which tapered gage bars 19 are slidably mounted. A collar 20 is mounted on the threaded outer portion 12 of the rod 10 and engages the outer ends of the bars 19 while the inner ends of the bars are similarly engaged by a collar 21 mounted on the threaded portion 11. An additional locking collar 22 is also preferably provided to act as a check nut behind the collar 21.

It will be noted that the head 13 is recessed on each side adjacent the threaded portions 11 and 12, and that the collars 20 and 21 are provided with cylindrical extensions closely fitting these recesses and protecting the threads 11 and 12 from dirt or injury in every position of the collars. The collar 22 is similarly provided with an annular extension fitting over the enlarged portion 15 for a similar purpose.

Constructed as above described, the gage bars 19 may be set to any size within the capacity of the particular gage by turning the collars 20 and 21 in one direction or the other, a suitable wrench or spanner being provided for this purpose. When the gage is set to the desired size, the collar 22 may be used as a check-nut to preserve the setting. The gage is thus readily adjusted and when once set it is firm and rigid and the setting cannot be accidentally disturbed.

In Figs. 3 and 4 I have shown a slightly modified structure in which the inclined guideways 25 in the head 26 are formed with straight parallel sides, and the gage-bars 27 are similarly formed with a substantially rectangular section. The ends of the gage bars 27 are provided with beveled extensions 28 and 29 (Fig. 3) and the adjusting collars 30 and 31 are provided with internal conical surfaces adapted to engage the beveled extensions 28 and 29, and thus firmly seat the gage bars in the guideways. Otherwise the construction of the gage is substantially as previously described.

It will be understood that the outer faces of the gage bars in either form are curved to form arcs of a circle of suitable diameter for the capacity of the gage.

Having thus described my invention and a modification thereof, it will be evident that other changes and modifications may be made therein by those skilled in the art within the spirit and scope of my invention as set forth in the claims, and I do not wish to be otherwise limited to the details herein disclosed, but what I claim is:—

1. A reference gage comprising a rod having axially separated threaded portions, a head fixed to said rod between the threaded portions thereof, said head having a plurality of longitudinal guideways therein inclined toward the axis, a plurality of tapered gage bars slidable in said guideways, and a pair of collars threaded on said rod, one at each end of said bars, said collars being effective to position said bars axially in said head.

2. A reference gage comprising a rod having axially separated threaded portions, a head fixed to said rod between the threaded portions thereof, said head having a plurality of longitudinal guideways therein inclined toward the axis, a plurality of tapered gage bars slidable in said guideways, a pair of collars threaded on said rods, one at each end of said bars, and means to lock one of said collars in adjusted position.

3. A reference gage comprising a rod having axially separated threaded portions, a head fixed to said rod between the threaded portions thereof, said head having a plurality of longitudinal guideways therein inclined toward the axis, a plurality of tapered gage bars slidable in said guideways, and a pair of collars threaded on said rod, one at each end of said bars, said head having recesses and said collars having extensions fitting said recesses and protecting the threaded portions of said rod.

4. A reference gage comprising a rod having axially separated threaded portions, a head fixed to said rod between threaded portions thereof, said head having a plurality of dove-tailed longitudinal guideways therein inclined toward the axis, a plurality of tapered gage bars of dove-tailed cross section slidable in said guideways, and collars threaded on said rod and engaging the opposite ends of said bars, said collars being effective to move said bars simultaneously in either direction relatively to said head.

5. A reference gage comprising a rod having axially separated threaded portions, a head fixed to said rod between threaded portions thereof, said head having a plurality of longitudinal guideways therein inclined toward the axis, a plurality of tapered gage bars slidable in said guideways and having oppositely beveled ends, and a pair of collars threaded on said rod and having internal conical surfaces adapted to engage the beveled ends of said gage bars and to seat said bars firmly in said guideways.

In testimony whereof I have hereunto affixed my signature.

JOHN BATH.